United States Patent [19]

Lane, Jr. et al.

[11] 4,400,501
[45] Aug. 23, 1983

[54] ANHYDROUS PRECIPITATION OF POLYCYCLOOLEFINS

[75] Inventors: Parley C. Lane, Jr., Cuyahoga Falls; Linwood P. Tenney, Hudson; Gerald V. Wootton, Akron, all of Ohio

[73] Assignee: The B. F. Goodrich Company, Akron, Ohio

[21] Appl. No.: 376,368

[22] Filed: May 10, 1982

[51] Int. Cl.$^3$ .............................................. C08F 6/12
[52] U.S. Cl. .................................. 528/496; 526/281; 526/283
[58] Field of Search ........................................ 528/496

[56] References Cited

U.S. PATENT DOCUMENTS 4,069,376 1/1978 Minchak ............................ 526/280

Primary Examiner—Stanford M. Levin
Attorney, Agent, or Firm—George A. Kap

[57] ABSTRACT

Precipitation of polymer from a polymer cement comprising the polymer dissolved in cyclohexane is accomplished by mixing the cement with methanol whereby the polymer precipitates forming a polymer slurry comprising polymer solids dispersed in cyclohexane and methanol, heating the polymer slurry to vaporize methanol and cyclohexane in azeotropic proportion, condensing the vaporized methanol and cyclohexane whereby it separates into an upper phase that is nearly all cyclohexane and a lower phase that is rich in methanol, separating the phases, and separating the polymer from the residual slurry comprising polymer solids dispersed in methanol, the polymer being a reaction product formed by ring opening polymerization of at least one monomer containing at least one norbornene group. The process can be conducted in batchwise segments or continuously throughout.

10 Claims, 1 Drawing Figure

ANHYDROUS PRECIPITATION OF POLYCYCLOOLEFINS

BACKGROUND OF THE INVENTION

In the solution ring opening polymerization of cycloolefins, the product discharged from the reactor is a honey-like cement that consists principally of a nonpolar carrier solvent in which the polymer is dissolved. The polymer content is normally on the order of about 15% by weight. The polymer can be any of the family of polymers that are made by homopolymerization or copolymerization of one or more of cycloolefins that contain the norbornene group. Polymerization can be conducted either batchwise or continuously.

After the honey-like cement is prepared, it is necessary to separate the polymer from its carrier solvent. In the past, steam stripping has been used exclusively in plant operations to extract the polymer from the carrier solvent. In steam stripping, the cement is injected into a jet of steam that is directed into a vessel containing hot water. As contact is made between the cement and the jet of steam, the carrier solvent is flashed off as vapor, depositing the polymer in particle form in the hot water.

Due to many disadvantages that accompany steam stripping of polycycloolefin cements, it is no longer used.

More recently, an alternate approach was discovered for isolating polymers of cycloolefins from the carrier solvent. Pursuant to this approach, the cement is mixed in a high shear mixer with a nonsolvent in the volume ratio of about 3 to 1 nonsolvent to cement whereby the polymer precipitates out. A nonsolvent is a liquid that is miscible with the nonpolar solvent that is used in the polymerization reaction but is a nonsolvent for the polymer. Examples of suitable nonsolvents include ethanol, n-propanol, isopropanol, and the like. Although on some occasions this recovery procedure produced granular, easy-to-dry product having bulk density of about 0.144 g/cc or 9 lb/ft$^3$, these results could not be reliably reproduced. What was obtained normally was a clump-like product of fine, irregular fluffy microfibers that packed cottonlike when filtered and was difficult to dry, the dry product having bulk density below 0.08 g/cc or 5 lb/ft$^3$.

When polymer cement is precipitated or coagulated in a nonsolvent medium, the high polymers appear to precipitate from and the oligomers, catalyst residues, and the like, remain solubilized in the mixed nonsolvent-solvent medium. Since a substantial portion of the impurities are soluble in the nonsolvent, this recovery process succeeded in removing the bulk of the impurities from the polymer. However, this approach was not entirely successful since large volumes of contaminated liquid was produced composed primarily of nonsolvent, cyclic nonpolar reaction solvent, and impurities that included residual shortstop for the polymerization reaction, adducts of the shortstop with catalyst residues, residual catalyst components, oligomers, etc. Solvent recovery of the large volume of nonsolvent-solvent liquid is difficult and expensive, and especially complicated using water-free nonsolvents which azeotrope with water and the solvent.

More specifically, in reference to the use of a nonsolvent in polymer extraction, at bottom of col. 4 of the Minchak U.S. Pat. No. 4,069,376 it is disclosed that a polymer of one or more cycloolefins can be isolated by precipitation using a nonsolvent selected from lower alcohols such as methanol, ethanol, isopropanol, and the like. This is a known method wherein polymer cement and a nonsolvent are mixed in a high-shear intensive mixer whereby a slurry is formed. The slurry is then conveyed to a slurry tank where it is further agitated at ambient temperature, and from the tank the slurry is taken to a centrifuge or a filter where the polymer is separated and taken to a drying operation, whereas the filtrate is pumped to a recovery operation where the cyclic nonpolar solvent is separated from the nonsolvent and recovered. The filtrate is composed essentially of the cyclic nonpolar solvent and the nonsolvent hydrocarbon.

SUMMARY OF THE INVENTION

This invention relates to the use of methanol in the precipitation of polycycloolefins from cements comprising polycycloolefins in cyclohexane solvent at a temperature ranging from at or near the boiling point of methanol/cyclohexane azeotrope to the boiling point of methanol whereby the methanol/cyclohexane azeotrope is removed as a vapor and condensed whereupon the condensate separates into an upper and lower phase, the upper phase being nearly all cyclohexane and the lower phase being rich in methanol, followed by additional steps of separating the polycycloolefins and recovery of methanol. The temperature range for precipitation is about 55° to 65° C. at atmospheric pressure.

DETAILED DESCRIPTION OF THE INVENTION

Figure 1:
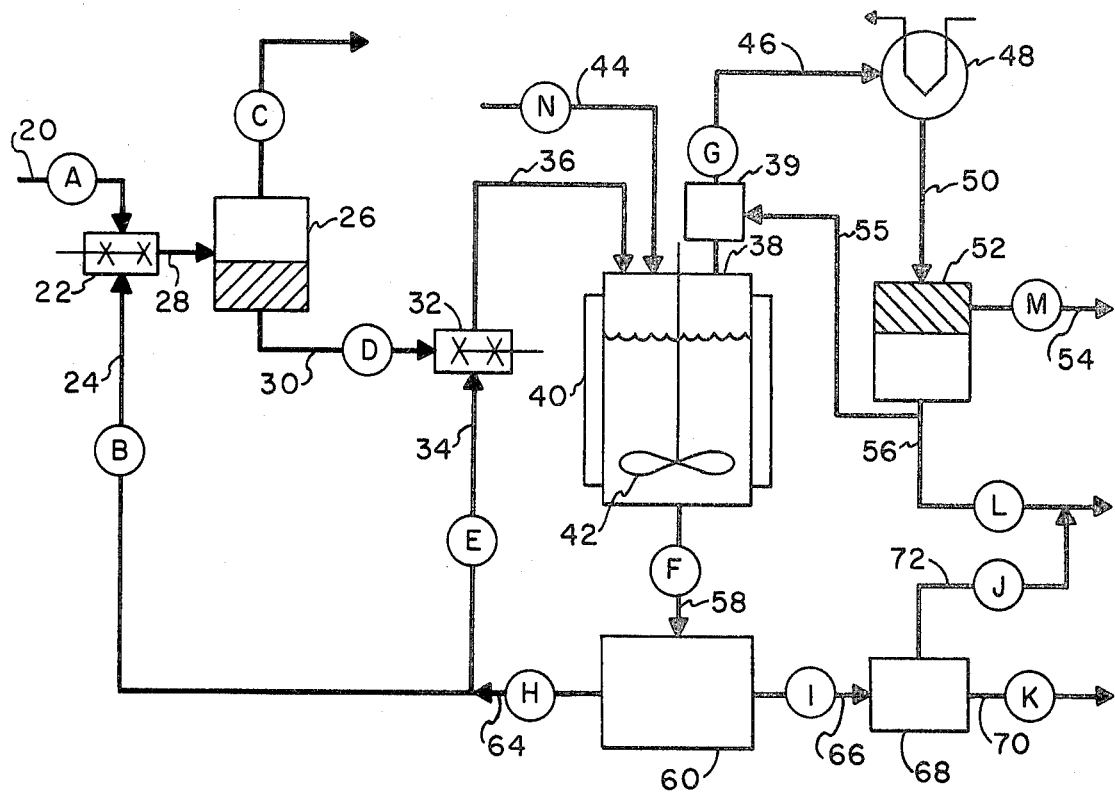
FIG. 1 is a flow diagram that illustrates precipitation of polycycloolefins from cements comprising polycycloolefins dissolved in cyclohexane solvent by means of methanol nonsolvent at a temperature ranging from at or near the boiling point of methanol/cyclohexane azeotrope to the boiling point of methanol.

The invention disclosed herein resides in the use of methanol as a nonsolvent in the precipitation of a polymer cement that comprises a polycycloolefin and a cyclohexane solvent at a temperature from at or near the boiling point of the methanol/cyclohexane binary azeotrope to the boiling point of methanol. At atmospheric pressure, the temperature range contemplated herein is about 55° to 65° C. If conditions are changed whereby precipitation is carried out below or above atmospheric pressure, the operable temperature range can be adjusted accordingly. Operating in the defined temperature range allows removal from the cement slurry of methanol/cyclohexane binary azeotrope that boils at 54° C. which, upon condensation, yields a two-phase system, an upper phase that is nearly all cyclohexane and a lower phase that is rich in methanol. Removal of the solvent-rich upper phase facilitates solvent recovery and provides other advantages.

The precipitation process is illustrated in FIG. 1 in connection with a preconcentration operation that preconcentrates the cement from about 15% solids to about 20 to 35% solids, although it is possible to preconcentrate the cement to even greater solids level. The preconcentration operation is optional. If preconcentration is employed, the cement will have a solids concentration greater than about 15%, however, if preconcentration is not employed, the cement employed in the precipitation process disclosed herein can come directly from the polymerization operation and normally will contain about 15% solids.

Referring to FIG. 1, polymer cement comprising a cycloolefin polymer dissolved in cyclohexane solvent is introduced via conduit 20 to mixer 22. The polymer cement has solids concentration of about 15%, the solids portion of the cement is essentially a copolymer of 90 parts by weight methyltetracyclododecene and 10 parts by weight methylnorbornene and the 85% liquid portion can be essentially cyclohexane. Also added to mixer 22 is methanol through line 24 that is mixed with the cement. In this process, the methanol extracts a substantial portion of solvent from the cement causing it to form a gel-like substance of increased dissolved polymer content, referred to as preconcentrated cements. From mixer 22, the preconcentrated cement is pumped to separator tank 26 via line 28 where the cement slurry separates, in absence of agitation, into two phases: an upper liquid phase containing methanol and cyclohexane, that is pumped to recovery through line C, and a lower liquid phase consisting of the gel-like preconcentrate.

Amount of methanol used in the preconcentration operation should be sufficient to preconcentrate but insufficient to precipitate the polymer. This amount is about 5 to 100 parts methanol per 100 parts cement, on volume basis.

The preconcentration operation can be carried at ambient temperature and generally, in the temperature range from the freezing point to the boiling point of the methanol-cyclohexane azeotrope.

If the cement conveyed to mixer 22 is received directly from the polymerization operation, temperature of the cement will be about 40° to 50° C., in which case, preconcentration can be carried out at an elevated temperature that facilitates the operation due to reduced viscosity of the cement and improved preconcentration of the cement and improved extraction of impurities. In such a case, preconcentration can be accomplished at higher temperatures without adding heat, since temperature of methanol entering mixer 22 through line 24 is about 65° C.

The preconcentrated lower phase, containing cyclohexane and polymer, is withdrawn from separator tank 26 through conduit 30 and conveyed to a high shear, high intensity mixer 32. Also introduced into mixer 32 is methanol through conduit 34. Mixer 32 is a high shear, high intensity mixer of the Eppenbach type. Precipitation takes place in mixer 32 instantaneously upon mixing methanol with the cement. The particles of polymer thus form a dispersion in a liquid phase containing cyclohexane and methanol. The mixture of precipitated polymer in the liquid phase will henceforth be referred to as polymer slurry.

Polymer slurry from mixer 32 is conveyed via line 36 to slurry tank 38 that is equipped with a heating means, such as an exterior steam jacket 40, and an agitator 42. Methanol from the recovery operation can also be added to the slurry tank through line 44. Some additional extraction can take place in the slurry tank.

As already mentioned, precipitation is carried out in the temperature ranging from at or near the boiling point of the methanol/cyclohexane azeotrope to the boiling point of methanol. At atmospheric pressure, the defined temperature range is about 55° to 65° C. Operating slurry tank 38 in this temperature range, preferably at or near the boiling point of methanol, i.e., 65° C., will allow the methanol/cyclohexane azeotrope to be removed or vaporized from the polymer slurry. For reasons to be discussed later, the temperature in the slurry tank should be kept at or near the boiling point of methanol.

In the precipitation of the polymer cement, the amount of methanol can vary from 2 to 15 volumes, preferably 3 to 8 volumes, per one volume of cement.

As the polymer slurry enters slurry tank 38, it is agitated and heated or maintained at the desired temperature. The vapor coming off the polymer slurry via line 46 is an azeotrope of methanol boiling at about 55° C. and having a vapor phase composition of 37% methanol and 63% cyclohexane, on weight basis, measured at standard pressure. The azeotrope in vapor state is conveyed through packed column 39 to condenser 48 where it is condensed and cooled to ambient temperature. The condensate is then taken via line 50 to decanter tank 52 where it separates into two phases with the following approximate phase split, on volume basis:
upper phase=43%
lower phase=57% The relative concentration of methanol and cyclohexane in the two phases on weight basis is as follows:
upper phase:
 methanol=3%
 cyclohexane=97%
lower phase:
 methanol=61%
 cyclohexane=39%

It should be noted that the upper phase is nearly all cyclohexane with only 3% methanol whereas the lower phase is rich in methanol containing 39% cyclohexane.

As was noted earlier, it is preferred to operate the slurry tank at or near the boiling point of methanol in order to assure that essentially all cyclohexane is vaporized. In a continuous precipitation operation illustrated in FIG. 1, some fractionation of the azeotropic vapor leaving the slurry tank is desirable to avoid excess methanol carryover. For this operation, it is most desirable to use a small amount of the methanol-rich lower condensed phase of the azeotrope as reflux line 55 with the required amount regulated by temperature of vapor to the condenser, as in any normal distillation process.

Vaporization of small additional amounts of methanol from the polymer slurry is not serious. However, if this condition is present and methanol is vaporized, methanol will be condensed and conveyed to the decanter tank 52 where it will distribute between the upper and lower phases. In such an instance, the amount of upper phase will be reduced, constituting an unnecessary burden on the recovery operation where cyclohexane is separated from methanol.

The gist of this invention, therefore, resides in the application of the phase separation of the methanol/cyclohexane azeotrope upon condensation. This feature greatly facilitates recovery operations due to the facts that (1) the upper phase of the condensed azeotrope is nearly all cyclohexane and (2) the recovery operation can be accomplished without water extraction for further separation of cyclohexane from methanol. The precipitation, extraction, and recovery processes described hereunder may be conducted either in batchwise segments or wholly continuously as shown in the accompanying FIG. 1. For practical and technical reasons not important to the embodiment of this invention, continuous mode is the preferred method for process operations.

In the continuous process operation, the methanol feed in line 44, pumped to the process to make up for methanol vapor that was removed from the slurry tank as part of the cyclohexane/methanol azeotrope, is preferably passed first either totally or partially as a final wash on the centrifuge and then separately fed to the mixer along with additional filtrate from the centrifuge, as required for precipitation, rather than being fed directly to the slurry tank, as shown in FIG. 1.

The preconcentration step is optional but when employed, affords the special advantage of removing residual impurities which can be present in the methanol being recycled to the precipitation process via line 34. In the absence of preconcentration, an obvious alternative is to send stream 24 to recovery for this purpose, if desired.

From decanter tank 52, the upper phase is pumped via line 54 to cyclohexane recovery whereas the lower phase is pumped via line 56 to methanol recovery. The recovery operations are not described since they do not form a part of the invention disclosed herein.

A mixture of polymer and methanol is removed through the bottom of slurry tank 38 through line 58 and conveyed to separator 60. The separator can be a centrifuge or a filter or any other suitable separating means. The polymer is separated from methanol in separator 60 and conveyed to dryer 68 whereas methanol is pumped through line 64, a portion of which is pumped to mixer 32 via line 34 and remainder through line 24 to mixer 22. The wet polymer from separator 60 containing about 70 weight % methanol is conveyed through line 66 to dryer 68 where it is dried to less than 1% methanol. The dried polymer is taken to storage through line 70 whereas methanol from the dryer is conveyed through line 72 and combined in conduit 56 with the lower phase from the decanter tank 52 and taken to methanol recovery, or alternately, this methanol may be recycled directly to the precipitation or preconcentration steps. The lower phase from the decanter consists essentially of 61% methanol and 39% cyclohexane, by weight.

Separation of the methanol/cyclohexane azeotrope condensate into two phases is unique. Other alcohols do not have this ability. The fact that the upper phase of the condensed azeotrope is nearly all cyclohexane provides a myriad of advantages such as the need for much less recovery capacity, reduced energy costs, reduced recovery operating costs, and the like. This allows for recycling of the bulk of methanol needed for precipitation directly from the separator to precipitation without the need for further recovery treatment. Operating at an elevated temperature enhances the extractive power of methanol for solvent, modifier, and impurities. For instance, methanol forms an azeotrope with hexene-1, a molecular weight modifier, boiling at about 48° C. This means that the modifier, and probably some residual impurities, are flashed-off as vapor from the hot polymer slurry together with cyclohexane. Therefore, operating at an elevated temperature results in a reduction in the volume of methanol required and improves its effectiveness. Furthermore, at higher temperature, viscosity of cement, as original feed or as preconcentrated cement, is reduced thus facilitating handling and extraction efficiency as well as improved quality of the product due to enhanced extraction of residual impurities from the polymer particles. It was also discovered that the use of methanol, as compared to other alcohols, produced denser and more granular polymer particles that can be dried and handled more easily. Also, in contrast to the use of other alcohols, this precipitation process is water free. In this instance, as noted above, water extraction is not required for solvent recovery as it is with other alcohols used as nonsolvents in similar systems.

The polymers of cyclic olefins that contain the norbornene moiety can be made by ring opening polymerization of the cyclic olefins in the presence of a metathesis catalyst comprising at least one alkylaluminum halide cocatalyst and at least one tungsten or molybdenum compound catalyst. Polymerization is accomplished by mixing in a reactor a monomeric cyclic olefin, or a mixture thereof with or without other copolymerizable monomers, with cyclohexane nonpolar hydrocarbon solvent. A molecular weight modifier, selected from nonconjugated acyclic olefins, such as hexene-1, is then added to the reactor followed by an alkylaluminum halide cocatalyst and a tungsten or molybdenum compound catalyst. The polymerization reaction is conducted at 0° to 200° C., preferably 25° to 100° C., with stirring and produces little heat. Reaction time to completion is on the order of less than 2 hours.

Polymerization may be conducted either batchwise or continuously. The precipitation processes described hereunder will perform equally well in either case, despite some differences in chemical make up of cements resulting from inherent kinetic differences existing between the two reaction modes. Continuous polymerization requires substantially less molecular weight modifier and catalyst and produces polymers of narrower molecular weight distribution than batch operation. For these and other practical considerations of a technical nature not important to the embodiment of this invention, continuous polymerization is the preferred method most regularly employed for process operations.

Reaction product that is recovered directly from the reactor is a smooth, viscous cement of honey-like consistency that comprises a polymer dissolved in the cyclohexane solvent. Polymer or solids concentration in the cement is about 15% and dilute solution viscosity of the polymer is normally in the range of about 0.1 to 3. Dilute solution viscosity is a measure of viscosity of a solution of 0.25 gram of polymer in one deciliter of toluene at 25° C. The polymer cement can be preconcentrated from about 15% solids to at least about 20% solids and up to about 80% solids. Preconcentration can be accomplished by mixing the cement with about 0.2 to 1 volume of methanol, or another alcohol as nonsolvent, per 1 volume of cement.

The norbornene-type monomers or cycloolefins that can be polymerized in accordance with the process described herein are characterized by the presence of the following nonbornene group defined by formula I, that can be substituted or unsubstituted:

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II and III, each containing at least one norbornene group:

where R and $R^1$ are independently selected from hydrogen, alkyl, and aryl groups of 1 to 20 carbon atoms, and saturated and unsaturated cyclic groups of 3 to 12 carbon atoms formed by R and $R^1$ together with the two ring carbon atoms connected thereto. In a preferred embodiment, R and $R^1$ are independently selected from hydrogen and alkyl groups of 1 to 2 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-isopropyl-2-norbornene, 5-ethyl-2-norbornene, 5-butyl-2-norbornene, 5-hexyl-2-norbornene, 5-octyl-2-norbornene, and 5-dodecyl-2-norbornene.

Especially contemplated herein are homopolymers, copolymers and terpolymers of methylnorbornene, methyltetracyclododecene, and dicyclopentadiene, and preferably homopolymers of methyltetracyclododecene and copolymers of methyltetracyclododecene and methylnorbornene. The copolymers contain 1 to 75% by weight, preferably 10 to 30%, of polymerized methylnorbornene with remainder being methyltetracyclododecene whereas the terpolymers contain 1 to 75% by weight, preferably 1 to 45%, of polymerized methylnorbornene and 25 to 98% by weight, preferably 50 to 98%, of polymerized methyltetracyclododecene, with remainder being polymerized dicyclopentadiene. The norbornene-type monomers can contain up to about 20% by weight of at least one other non-norbornene type copolymerizable monomer.

The preferred catalyst employed in the polymerization of cycloolefins is a combination of an aluminum halide with elemental halide or an alkylaluminum halide cocatalyst and a tungsten or a molybdenum compound catalyst. The tungsten and molybdenum in the metal compound catalyst can be the cation, such as in a tungsten or a molybdenum halide, or the anion, as in a tungstate or a molybdate.

The useful molybdenum and tungsten compound catalysts include molybdenum and tungsten halides such as molybdenum petachloride, molybdenum hexachloride, molybdenum pentabromide, molybdenum hexafluoride, molybdenum pentaiodide, tungsten hexachloride, tungsten hexafluoride, and the like. Preferred catalysts are the molybdenum halides, especially molybdenum pentachloride.

The aluminum halide cocatalysts are selected from $RAlX_2$, $R_2AlX$, $R_3Al_2X_3$, $R_3Al$, $AlX_3$, and mixtures thereof. In the formulas for the alkylaluminum halide catalysts, R is an alkyl radical containing 1 to 12 carbon atoms, preferably about 2 to 4 carbon atoms, and X is a halogen selected from chlorine, iodine, bromine and fluorine. Specific examples of such aluminum halides include ethylaluminum dichloride, diethylaluminum monochloride, ethylaluminum sesquichloride, diethylaluminum iodide, ethylaluminum diiodide, and trialkylaluminum compound with elemental iodine.

Although aluminum is the preferred reducing agent in the aluminum halide cocatalysts, other organometallic halide reducing agents can function as well. Metals that form suitable organometallic cocatalysts include lithium, magnesium, boron, lead, zinc, tin, silicon and germanium. Also, the metallic hydrides can be substituted in whole or in part for the organometallic cocatalysts.

The molybdenum or tungsten compound catalyst, or a mixture thereof, is employed at a level of about 0.01 to 50 millimoles molybdenum or tungsten per mole of total monomer, preferably 0.1 to 10 millimoles. The molar ratio of the aluminum halide to the molybdenum and/or tungsten compound catalyst is not critical and can be in the range of about 200:1 or more to 1:10, preferably from 10:1 to 2:1 of aluminum to molybdenum or tungsten.

The use of polymerization reaction solvent in the process of this invention is a prerequisite, although if it is not used, the polymer would have to be dissolved in the solvent before undertaking the precipitation operation. The nonpolar solvent herein is cyclohexane, in which the polymer described herein is soluble. The solvent can be added at any point in the charging procedure, but a portion, preferably 0.1 to 10% of the total solvent, is used to dissolve the catalyst and the remainder added before the catalyst solution. Generally ½ to 2 liters of solvent is used per 100 grams of monomer.

A polymerization activator can be used but is generally not needed. Activation can be obtained by using air or peroxide or a hydroperoxide, especially the organic peroxides such as benzoyl peroxide. The activator can be employed in the range of up to 3 moles, preferably up to 1 mole, per mole of the aluminum halide cocatalyst. The activator can be added at any point in the charging procedure but is preferably added last or with the tungsten or molybdenum compound catalyst.

At least one nonconjugated acyclic olefin can be used as a molecular weight modifier having at least one hydrogen on each double-bonded carbon atom and containing 2 to 12 carbon atoms, preferably 3 to 8 carbon atoms. Examples of suitable acyclic olefins include 1-butene, 3-methyl-1-butene, 2-pentene, 4-methyl-2-pentene, hexene-1, and the like. In the process of this invention, it is important that the acyclic olefin employed boil at or below the boiling temperature of methanol either by itself or in azeotropic composition with other system components present in the slurry tank.

The nonconjugated acyclic olefin can be used at a level of about 0.0001 to 1 mole per mole of the monomer charge. The nonconjugated acyclic olefin can be charged directly or in solution at any point in the charging procedure, but it is preferably charged along with the monomers. When charged last, the nonconjugated acyclic olefin is preferably charged before the reaction begins.

In reference to the polymerization reaction, the monomers can be added at any point in the charging procedure. Normally, however, for continuous polymerization, the monomers, the solvent, and the nonconjugated acyclic olefin are added to the reactor as a mixture together with the alkylaluminum halide cocatalyst. The tungsten or molybdenum compound catalyst is added separately in a hydrocarbon solvent. Completion of the polymerization reaction is indicated by the disappearance of the monomer in the charge, as monitored by gas chromatography.

The volume ratio of methanol to cement for precipitation can vary from about 2/1 to 15, preferably 3/1 to 8/1 for 15% total solids cements and higher for preconcentrated cements, normally about 10/1. Process economies strongly favor the lower end of the range, although at higher levels, coalescence of polymer particles in subsequent process steps is avoided. Amount of methanol will also depend on the solids concentration of the cement, with the more concentrated cement requiring more methanol. The polymer, generally, precipitates out in the form of fluffy clumps composed of a multitude of tangled fibrous strands that are normally smaller than 1 millimeter in length, however, this tendency is reduced using methanol in comparison with other polar nonsolvent precipitants. The polymer can then be separated by filtration or centrifuging, dried, and compounded with various additives, as is well known in the art.

The compounded polymers described herein can be injection molded to produce machine parts, containers, electronic components, etc., or they can be extruded into profile shapes, sheets, rods, tubular products, and other mechanical products obtained by pressing, stamping, and other fabricating means.

The following examples are set forth to illustrate the invention disclosed herein in greater detail in reference to the use of specific materials and conditions.

EXAMPLE 1

Referring to FIG. 1, 100 parts by weight per hour of polymer cement is introduced as stream A to mixer 22. The polymer cement contains about 15% solids and is at a temperature of about 45° C. The polymer is a 80/20 copolymer, on weight basis, of methyltetracyclododecene (MTD) and methylnorbornene (MNB), respectively, having dilute solution viscosity of 0.86. Also added to mixer 22 is 300 parts by weight per hour of methanol as stream B, as a recycle stream from separator 60. Temperature of methanol is about 65° C. The cement slurry is then pumped to separator tank 26 where preconcentration takes place by formation of an upper and lower phase, the upper phase being stream C that is taken-off the top and the lower phase being stream D that is withdrawn from the bottom of tank 26. Stream C consists essentially of 300 parts per hour methanol and 215 parts per hour cyclohexane whereas stream D is the preconcentrated cement at a temperature of about 65° C. consisting essentially of 350 parts per hour of cyclohexane and 100 parts per hour of the polymer, the preconcentrated cement containing about 22% solids. Mixer 22 is an Eppenbach intensive pipeline mixer. Stream C from separator tank 26, consisting essentially of 300 parts per hour of methanol and 215 parts per hour of cyclohexane, is pumped to a recovery operation where the two components are separated. Preconcentrated cement stream D, in the amount of 450 parts per hour and containing about 22% solids, is conveyed to mixer 32 along with 1500 parts per hour of methanol as stream E where the streams are mixed and where precipitation takes place upon contact with methanol nonsolvent that functions as a coagulant or precipitant. The mixture of polymer particles, methanol, and cyclohexane, i.e., polymer slurry, is taken from mixer 32 and conveyed to slurry tank 38 via line 36 in amount of 1950 parts per hour. Additional methanol in amount of 605 parts per hour is added to the slurry tank as stream N. The polymer slurry in the slurry tank is heated to or maintained at a temperature of about 65° C. while being gently agitated. The overhead vapor stream G from slurry tank 38 is an azeotrope of methanol and cyclohexane boiling at 54° C. Stream G consists of 205 parts per hour of methanol and 350 parts per hour of cyclohexane, with a trace of impurities. Since hexene-1 also forms an azeotrope with methanol boiling at about 48° C., this azeotrope comes off along with the methanol/cyclohexane azeotrope. Stream F, consists essentially of 1900 parts per hour of methanol and 100 parts per hour of polymer, is conveyed to separator 60 where the polymer is separated and taken to dryer 68 and methanol is recycled, 1500 parts per hour of methanol being pumped to mixer 32 for precipitation and 300 parts per hour of methanol is pumped to mixer 22 for preconcentration. The polymer from the separator contains about 100 parts per hour of methanol. Upon drying, most of the methanol from the wet polymer is removed from the polymer and the dry polymer, containing less than 1% by weight methanol, is taken to storage.

Overhead vapor stream G, i.e. an azeotrope of methanol/cyclohexane, is condensed in condenser 48 and the condensate is introduced into decanter tank 52 where the condensate separates into an upper and lower phase in the respective phase split of 43%/57% by volume. The upper phase, taken-off the top as stream M, consists essentially of 7 parts per hour of methanol and 206 parts per hour of cyclohexane, is pumped to recovery whereas stream L, taken-off the bottom of decanter tank 52, consists essentially of 198 parts per hour of methanol and 144 parts per hour of cyclohexane, is combined with methanol vapor from dryer and then is also pumped to recovery.

The product is a clump-like material of fine irregular fluffy microfibers that pack cotton-like when filtered and is difficult to dry and handle. The dry product has bulk density of about 0.08 g/cc or 5 lb/ft$^3$.

The data for this example is summarized in Table I, below, where amounts are given in parts by weight per hour:

TABLE I

|            | A   | B   | C   | D   | E    | F    | G   | H    | I   | J   | K   | L   | M   | N   |
|------------|-----|-----|-----|-----|------|------|-----|------|-----|-----|-----|-----|-----|-----|
| Methanol   |     | 300 | 300 |     | 1500 | 1900 | 205 | 1800 | 100 | 100 |     | 198 | 7   | 605 |
| Cyclohexane| 565 |     | 215 | 350 |      |      | 350 |      |     |     |     | 144 | 206 |     |
| Polymer    | 100 |     |     | 100 |      | 100  |     | 100  | 100 |     | 100 |     |     |     |
| Impurities | SA  | T   | SA  | SA  | T    | T    | SA  | T    | T   | T   | T   | SA  | SA  |     |

In Table I, above, letter "T" represents a trace of impurities whereas "SA" represents a small amount of impurities that is greater than a trace amount.

EXAMPLE 2

This example demonstrates the use of methanol to precipitate MTD/MNB 80/20 copolymer having DSV of 0.86 from a polymer cement containing about 15% solids and consisting essentially of the copolymer dissolved in cyclohexane.

The experiment was conducted by feeding continuously the polymer cement and methanol to a 2-inch Eppenbach high intensity pipeline mixer and the polymer slurry from the mixer was fed to a slurry tank. Polymer slurry consisted essentially of a precipitated copolymer dispersed in a liquid medium containing cyclohexane and methanol.

Initially, about 30 kg of methanol was added to the agitated slurry tank and heated to 43° C. The cement and methanol feed rates to the mixer were set at 0.41 kg/min and 2.7 kg/min, respectively. The methanol was heated to 40° C. before entering the mixer. The precipitated copolymer in the form of a slurry was transferred to the hot slurry tank.

This process was continued until about 10 kg of cement was added to the mixer. The slurry tank was then heated to about 63° C. and cyclohexane/methanol azeotrope, and some methanol, was distilled at a head temperature of 60° C. Upon cooling, the distillate separated into two phases. The distillation process was continued until the head temperature rose to 62° C., which indicated that most of the cyclohexane had been distilled from the slurry tank. The slurry tank was cooled to ambient temperature and the slurry was filtered using a batch filter. The dried polymer was fibrous in nature and had a bulk density of about 0.06 g/cc.

We claim:

1. Process for preciptating a polymer from a cement comprising said polymer dissolved in cyclohexane, said process comprising mixing said cement with a sufficient amount of methanol to precipitate said polymer thus forming a polymer slurry containing polymer solids dispersed in cyclohexane and methanol; vaporizing methanol and cyclohexane in azeotropic proportion from said polymer slurry leaving behind spent polymer slurry containing essentially said polymer and methanol; condensing the vaporized methanol and cyclohexane whereby the condensate separates into an upper and a lower phase, the upper phase being essentially all cyclohexane whereas the bottom phase being rich in methanol; and separating said polymer from methanol; said polymer being a reaction product formed by ring opening polymerization of at least one norbornene-type monomer.

2. Process of claim 1 wherein the relative amount of methanol to said polymer cement is from about 2/1 to about 15/1, on volume basis.

3. Process of claim 2 wherein said polymer has dilute solution viscosity of about 0.1 to 3 and is selected from homopolymers, copolymers and terpolymers of methylnorbornene, methyltetracyclododecene, and dicyclopentadiene.

4. Process of claim 3 wherein said precipitation is accomplished approximately at or above the boiling point of the azeotrope of methanol and cyclohexane having the composition in the vapor state of about 37 methanol/63 cyclohexane, on weight basis, that boils at about 54° C. at atmospheric pressure.

5. Process of claim 4 wherein the phase split of the condensed methanol and cyclohexane is about 43% upper phase that is nearly all cyclohexane, and about 57% lower phase that is rich in methanol, on volume basis.

6. Process of claim 5 wherein precipitation is carried out below about 65° C. at essentially atmospheric pressure, the upper phase of the condensed methanol and cyclohexane being about 97% cyclohexane and 3% methanol, and the lower phase being about 61% methanol and 39% cyclohexane, on weight basis at ambient conditions.

7. Process of claim 6 including the steps of recycling the separated methanol for precipitating said polymer cement, drying the separated polymer cement, conveying the upper phase of the condensed methanol and cyclohexane to cyclohexane recovery, and conveying the lower phase of the condensed methanol and cyclohexane to methanol recovery.

8. Process of claim 5 including the steps of mixing said polymer cement with a sufficient amount of methanol to preconcentrate but not to precipitate said polymer cement whereby a two phase system is formed, the upper being a dilute phase containing essentially methanol and cyclohexane and a lower preconcentrated cement phase containing essentially cyclohexane and polymer; and precipitating said preconcentrated polymer cement by mixing therewith from 2 to 15 volumes of methanol per one volume of said cement.

9. Process of claim 8 including the steps of recycling a portion of the separated methanol for the preconcentration of said polymer cement which requires about 5 to 100 volumes of methanol per 100 volumes of said polymer cement, and recycling a portion of the separated methanol for the precipitation of said preconcentrated polymer cement which requires about 2 to 15 volumes of methanol per one volume of preconcentrated polymer cement.

10. Process of claim 9 wherein said polymer cement contains about 15% solids, said preconcentrated polymer cement contains at least about 20% solids, and said precipitation requires from about 3 to about 8 volumes of methanol per one volume of a polymer cement.

* * * * *